UNITED STATES PATENT OFFICE.

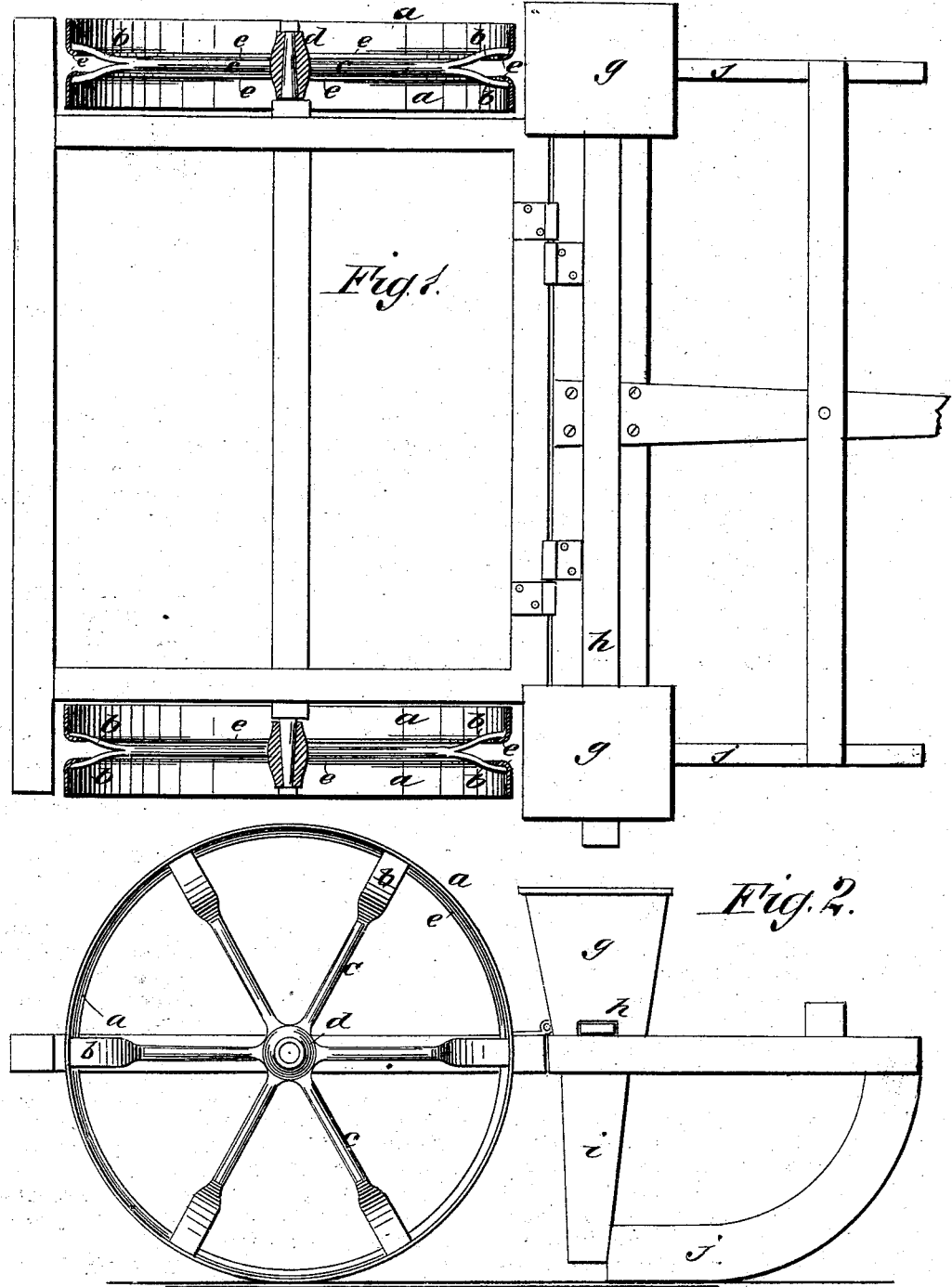

JOSEPH McDANIEL, OF JACKSON CENTRE, OHIO.

CORN-PLANTER.

SPECIFICATION forming part of Letters Patent No. 272,291, dated February 13, 1883.

Application filed October 24, 1882. (No model.)

*To all whom it may concern:*

Be it known that I, JOSEPH MCDANIEL, of Jackson Centre, in the county of Shelby and State of Ohio, have invented certain new and useful Improvements in Corn-Planters, of which the following is a full, clear, and exact description.

My invention consists of a wheel for corn-planters having a groove or space in the center of the tire to aid in covering the grain and leave a ridge of earth along the line, in which the corn is dropped, unpacked by the wheel, to avoid the hard crust of earth which forms over the seed by the rain and sun when the wheel treads and presses down the earth the whole breadth of its tread along the line in which the corn is planted, the said crust being very injurious to the young plants by the resistance it opposes to them, sometimes making it needful to go over the field and break up the crusts with hoes to enable the corn-sprouts to come up.

The invention consists of a wheel made with two narrow tires of iron mounted on branch spokes, the tires being placed a little distance apart, and having the inner edges turned inward or toward the hub to leave a narrow ridge of soft earth with sloping sides that will shed the rain well, all as hereinafter fully described.

Reference is to be had to the accompanying drawings, forming part of this specification, in which similar letters of reference indicate corresponding parts in both the figures.

Figure 1 is a horizontal section of the wheels and plan view of the rest of my improved corn-planter. Fig. 2 is a side elevation of the planter.

I make a couple of rims, $a$, preferably of tire-iron, (but they may be of any suitable material,) and mount them on the branches $b$ of any approved spokes, $c$, of any ordinary hub, $d$, flanging the inner edges, $e$, of said rims inward—that is to say, toward the hub—and locating said rims as wide apart on said spokes as may be preferred for the width of the ridge of unpacked earth it is desired to leave, the said ridge being the line along which the corn is to be planted by the dropping mechanism of the machine, which may be of any approved kind—say, hoppers $g$, dropper-slide $h$, and spouts $i$, suitably arranged in advance of the wheels and behind the furrow-opening runners $j$.

Supposing the spokes to consist of rods of rolled-iron bars, the outer ends may be split for a suitable length to form the branches $b$, which may be flattened, as shown in Fig. 2, and welded to the flanges $e$ of the rim.

Having thus fully described my invention, what I claim as new, and desire to secure by Letters Patent, is—

1. The improved wheel for corn-planters, consisting of two rims, $a$, having inner flanged edges, $e$, said edges sloping inward and said rims being located on and attached to branches $b$ of spokes $c$, with a space between said rims, substantially as described.

2. The improved wheel for corn-planters, consisting of two rims, $a$, having inner flanged edges, $e$, sloping inwardly, and of the spokes $c$, with their outer ends split longitudinally to form arms or branches $b$ integral therewith, said arms being secured to the rims $a$, outside of the edges or flanges $e$, substantially as and for the purpose set forth.

JOSEPH McDANIEL.

Witnesses:
JAMES A. HUGHES,
JAMES ARMSTRONG.